United States Patent [19]
Suzuki

[11] Patent Number: 4,998,107
[45] Date of Patent: Mar. 5, 1991

[54] CONTROL METHOD OF MULTI-CHANNEL DIGITAL-TO-ANALOG CONVERTING CIRCUIT

[75] Inventor: Kiichirou Suzuki, Choufu, Japan

[73] Assignee: Iwatsu Electric Company, Ltd., Tokyo, Japan

[21] Appl. No.: 283,134

[22] Filed: Dec. 12, 1988

[30] Foreign Application Priority Data

Dec. 26, 1987 [JP] Japan .................. 62-330542

[51] Int. Cl.$^5$ ............................................. H03M 1/66
[52] U.S. Cl. ..................................... 341/144; 341/141
[58] Field of Search ............... 341/144, 118, 141, 126, 341/142

[56] References Cited
U.S. PATENT DOCUMENTS

| | | | |
|---|---|---|---|
| 4,198,622 | 4/1980 | Connolly, Jr. et al. | 341/145 |
| 4,430,642 | 2/1984 | Weigand et al. | 341/141 |
| 4,503,421 | 3/1985 | Hareyama et al. | 341/145 |
| 4,591,832 | 5/1986 | Fling et al. | 341/141 |

Primary Examiner—William M. Shoop, Jr.
Assistant Examiner—Sharon D. Logan
Attorney, Agent, or Firm—Oblon, Spivak, McClelland, Maier & Neustadt

[57] ABSTRACT

Control method for obtaining enough blank time available for operations of a CPU other than switching by employing only a single D/A converter is disclosed. Since data to be processed comprise data requiring fast and slow responses, this method makes fast analog signals converted from fast response data to be delivered during every storing cycle through a specified analog switch group and slow analog signals converted from slow response data to be delivered following the fast analog signal during a distributed individual storing cycle through a periodically selected other analog switch group, thereby obtaining enough time available for operations of the CPU other than switching. The CPU operates a specific one of a plurality of analog switch groups every storing cycle and operates each of the remaining switch groups sequentially every storing cycle.

7 Claims, 8 Drawing Sheets

CONTROL METHOD OF MULTI-CHANNEL DIGITAL-TO-ANALOG CONVERTING CIRCUIT

BACKGROUND OF THE INVENTION

1. Field of the Invention

The present invention relates to a control method of a multi-channel digital-to-analog (D/A) converting circuit.

The invention is particularly concerned with a control method of a multi-channel digital-to-analog converting circuit for switchingly converting mutiple channel signals with a single D/A converter at no sacrifice of a high repetition rate operation and enabling the reduction of an operation time of a CPU (central processing unit) employed for the switching operation.

2. Description of the Prior Art

Figure 1A:
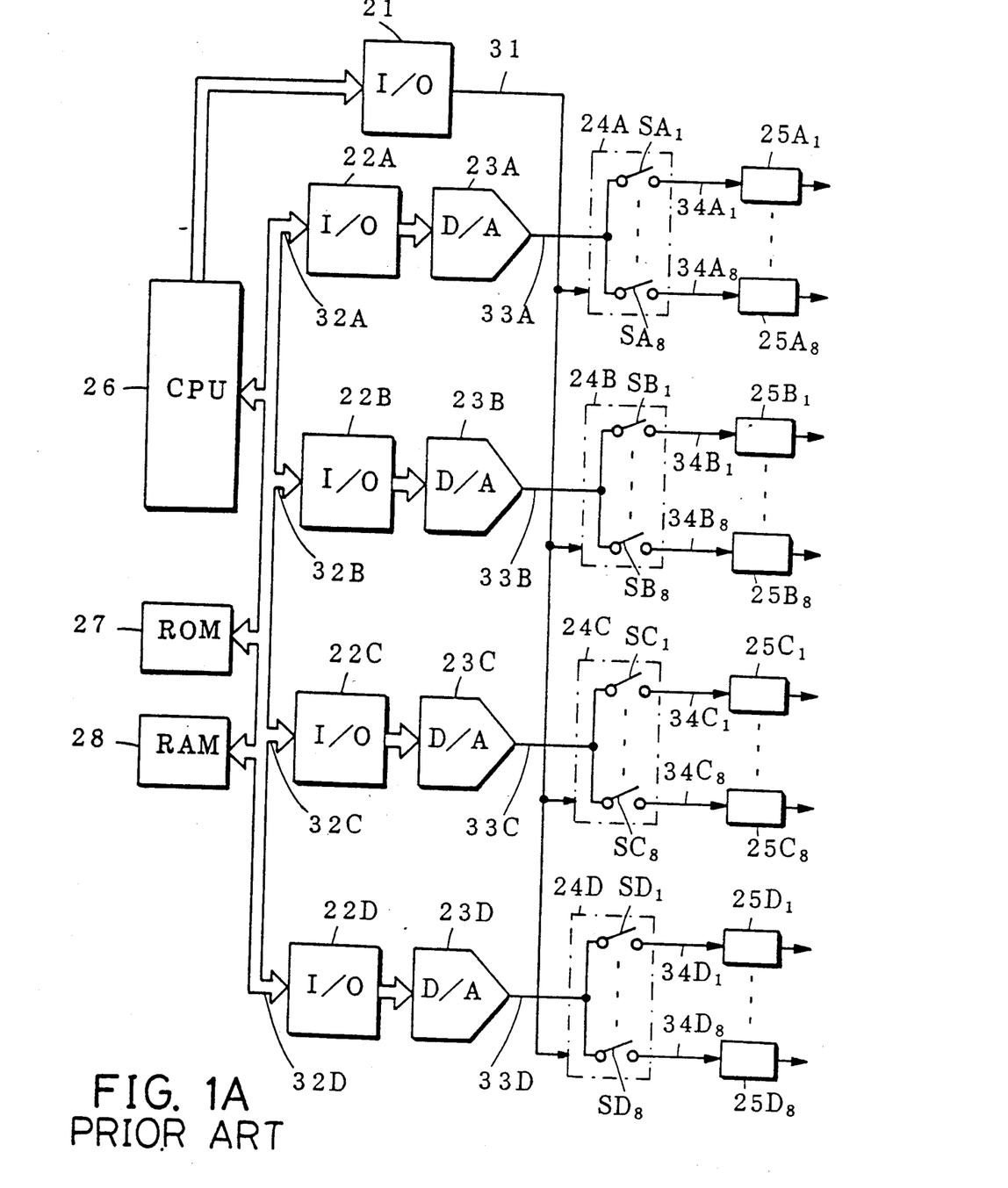
FIG. 1A is a block diagram of an example of a prior art.

FIG. 1A illustrates a circuit diagram of a multi-channel digital-to-analog converting circuit of the prior art. Reference numeral 21 indicates an interface circuit (I/O) to interface a CPU (central processing unit) 26 to each of analog switch groups 24A to 24D. Interface circuits 22A to 22D interface bus signals 32A to 32D connected with the CPU 26 to each of D/A converters 23A to 23D. Each of D/A converters 23A to 23D converts each of bus signals 32A to 32D applied through each of interface circuits 22A to 22D to each of analog signals 33A to 33D.

Analog switch groups 24A to 24D consist of eight analog switches $SA_1$ to $SA_8$, $SB_1$ to $SB_8$, $SC_1$ to $SC_8$ and $SD_1$ to $SD_8$, respectively, for time-divisionally transmitting analog signals 33A to 33D delivered from D/A converters 23A to 23D. Reference numerals $25A_1$ to $25A_8$, $25B_1$ to $25B_8$, $25C_1$ to $25C_8$ and $25D_1$ to $25D_8$ are analog voltage storing circuits for momentarily storing analog signals $34A_1$ to $34A_8$, $34B_1$ to $34B_8$, $34C_1$ to $34C_8$ and $34D_1$ to $34D_8$ which are respectively applied through analog switches $SA_1$ to $SA_8$, $SB_1$ to $SB_8$, $SC_1$ to $SC_8$ and $SD_1$ to $SD_8$.

The CPU 26 sends an analog switch control signal 31 to each of analog switch groups 24A to 24D, respectively, through the interface circuit 21 and bus signal 32A to 32D as digital signals to each of D/A converters 23A to 23D through each of interface circuits 22A to 22D and instructs a ROM (read-only memory) 27 to read the instruction data and a RAM (random access memory) 28 to write and read the data.

An operational principle of the circuit will be described below. Stored data are read as bus signals 32A to 32D from the RAM 28 upon receiving instructions, which are read from the ROM 27, and the signals 32A to 32D are applied to each of D/A converters 23A to 23D through each of interface circuits 22A to 22D.

Each of analog signals 33A to 33D, which are converted to analog by each of D/A converters 23A to 23D, is time-divisionally delivered from each of analog switches $SA_1$ to $SA_8$, $SB_1$ to $SB_8$, $SC_1$ to $SC_8$ and $SD_1$ to $SD_8$ forming each of analog switch groups 24A to 24D which are switched on or off by receiving the analog switch control signal 31 from the CPU 26 through the interface circuit 21.

Figure 1B:
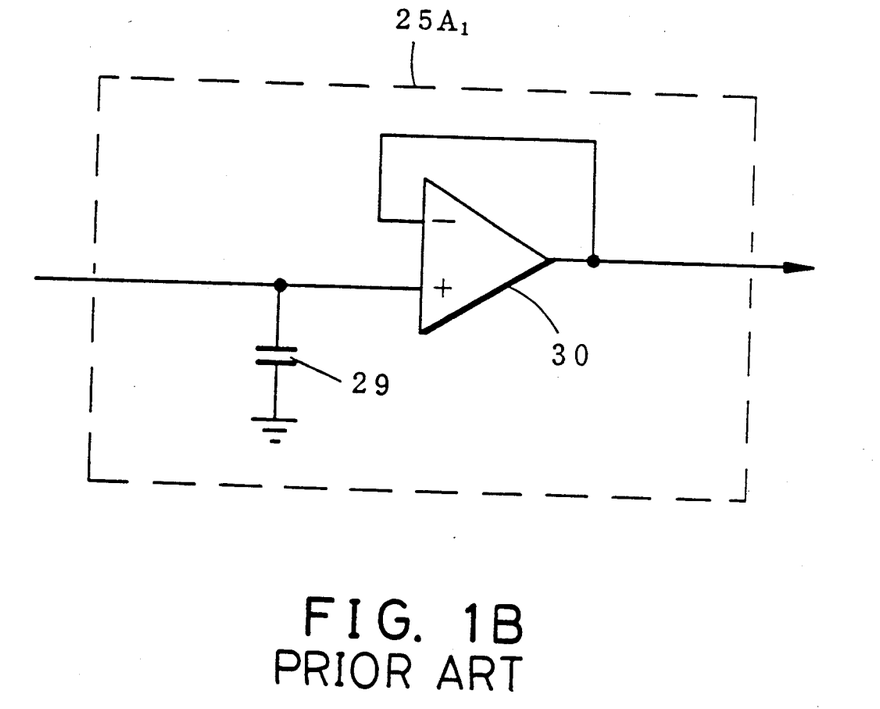
FIG. 1B is a circuit diagram illustrating an analog voltage storing circuit of the prior are shown in FIG. 1A.

Each of analog voltages $34A_1$ to $34A_8$, $34B_1$ to $34B_8$, $34C_1$ to $34C_8$ and $34D_1$ to $34D_8$, which is time-divisionally obtained through each of analog switches to $SA_1$ to $SA_8$, $SB_1$ to $SB_8$, $SC_1$ to $SC_8$ and $SD_1$ to $SD_8$, is momentarily stored by each of analog voltage storing circuits $25A_1$ to $25A_8$, $25B_1$ to $25B_8$, $25C_1$ to $25C_8$ and $25D_1$ to $25D_8$. As an analog voltage storing circuit 25A, etc., a circuit shown in FIG. 1B can be employed which comprises an analog voltage storing capacitor 29 and a high input impedance operational amplifier 30.

Figure 1C:
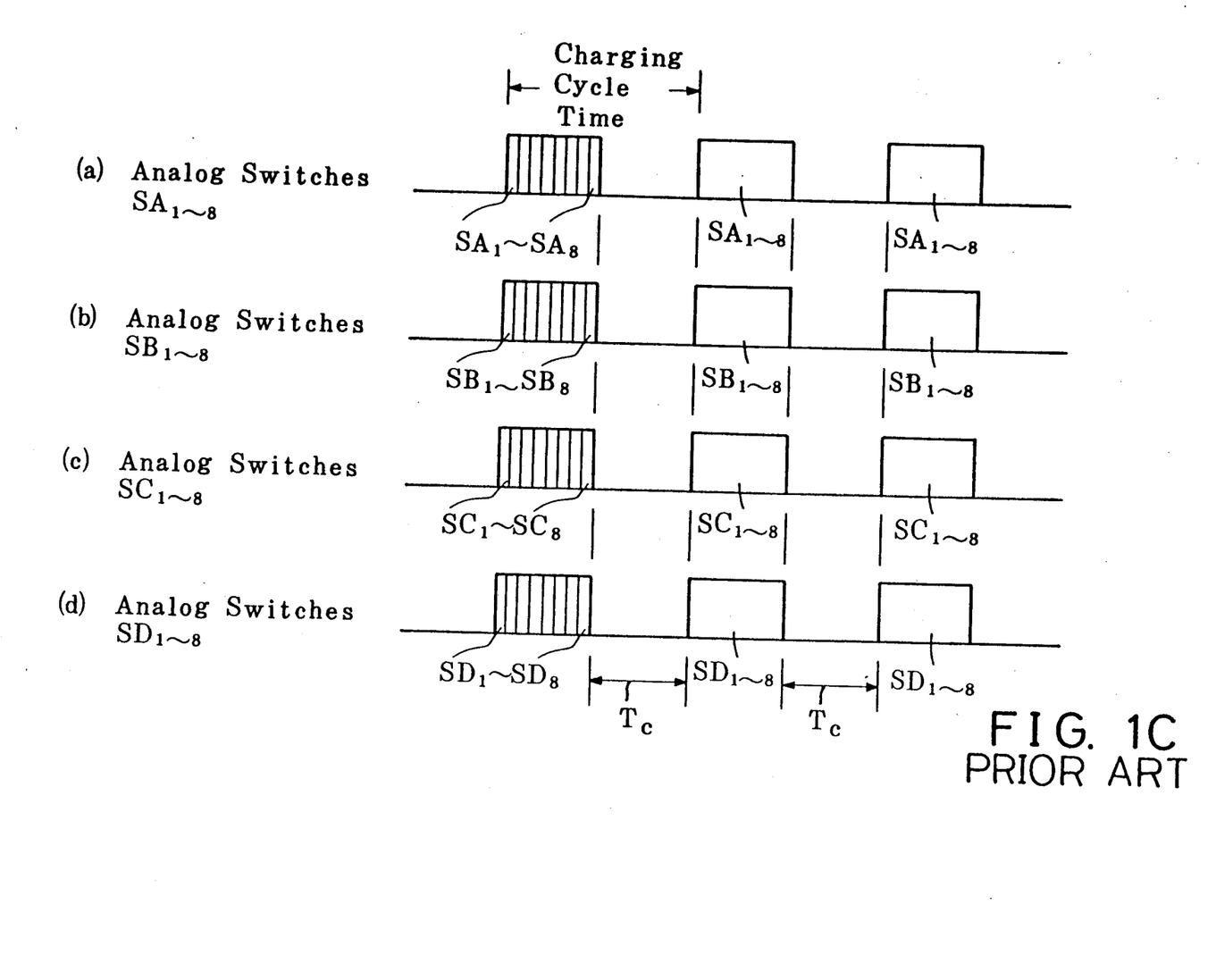
FIG. 1C is a time chart showing operations of analog switches of the prior art shown in FIG. 1A.

The above-described operation of four channels, which comprise four D/A converters 23A to 23D, is respectively executed in parallel as shown in a time chart of FIG. 1C.

Referring to FIG. 1C, each of groups of analog switches $SA_1$ to $SA_8$, $SB_1$ to $SB_8$, $SC_1$ to $SC_8$ and $SD_1$ to $SD_8$ switches synchronously with each other and each analog voltage storing capacitor 29 (FIG. 1B) is charged an analog voltage every repetition of charging cycle times. Thus, the charging operation of each capacitor 29 in four channels in parallel makes the processing time of CPU 26 (FIG. 1A) rather reduced and allows CPU 26 to have long blank time Tc available for other operations than switching.

Figure 2A:
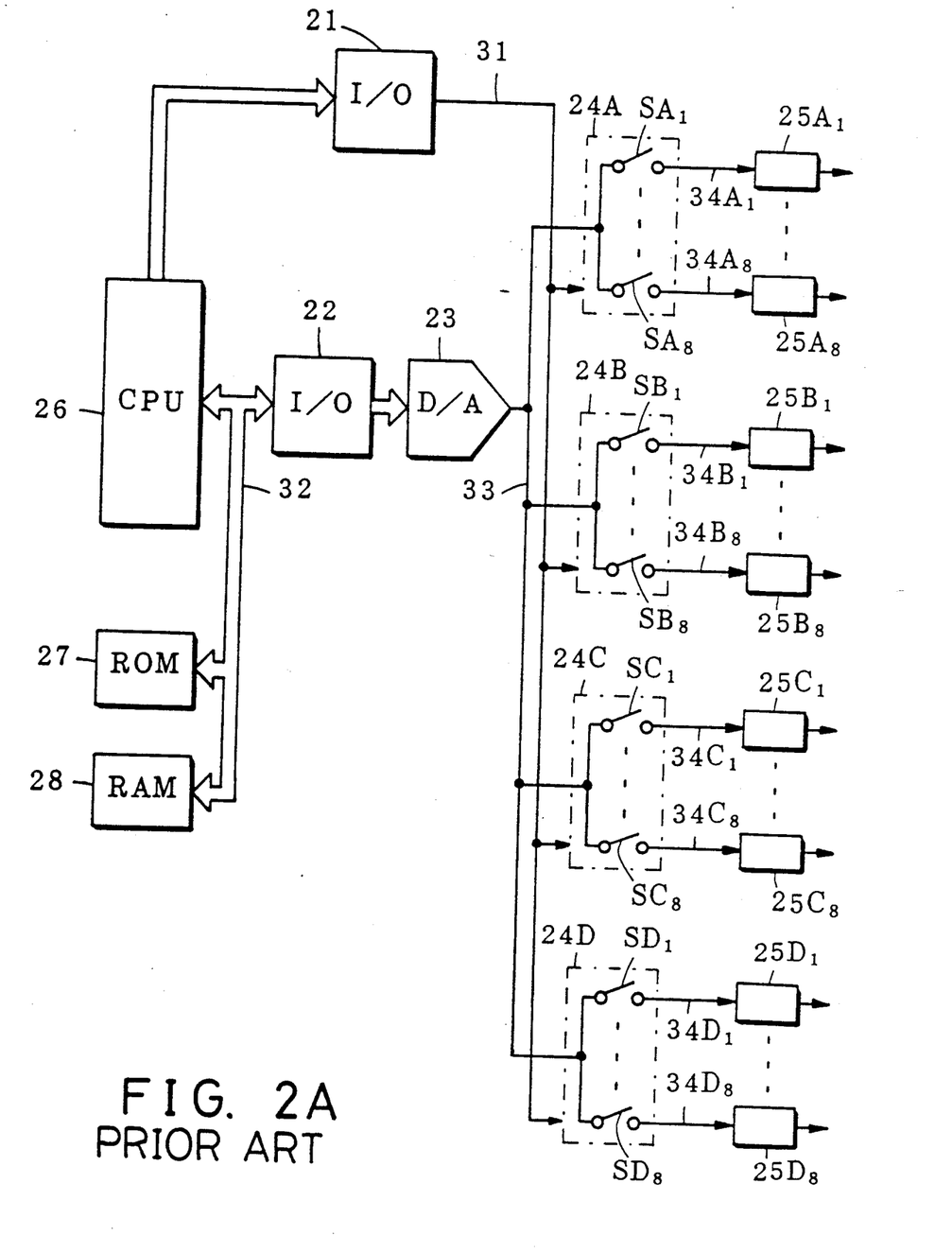
FIG. 2A is a block diagram of another example of a prior art.

Another circuit diagram of the prior art is shown in FIG. 2A, wherein like reference numerals and symbols represent like elements which correspond to those in FIG. 1A.

The circuit diagram shown in FIG. 2A differs from that shown in FIG. 1A in the point that a single D/A converter 23 converts a bus signal 32 through an interface circuit 22 to analog to obtain an analog output 33 which is distributed to each of analog switch groups 24A to 24D.

Figure 2B:
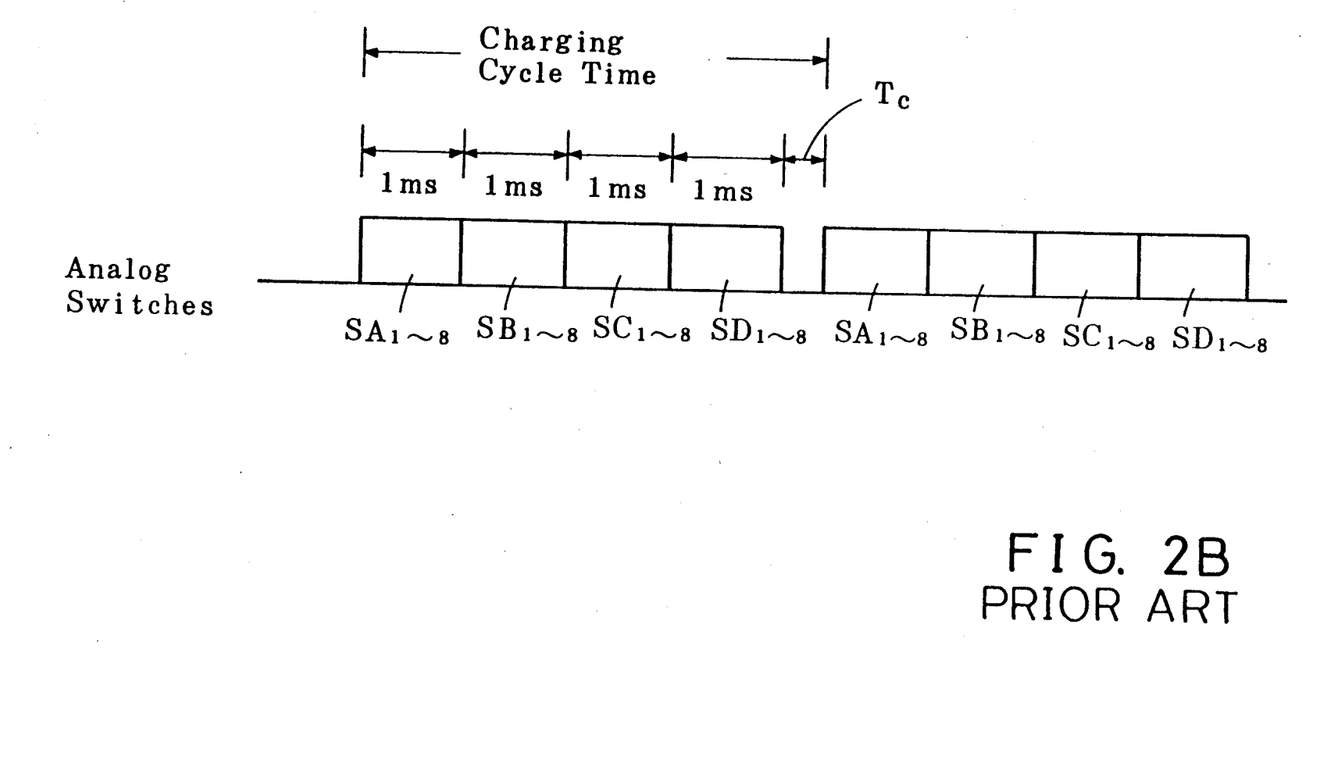
FIG. 2B is a time chart showing operations of analog switches of the prior art shown in FIG. 2A.

As shown in FIG. 2B, illustrates an operational timing of this circuit, analog switches $SA_1$ to $SA_8$ of one analog switch group 24A are switched on at first and each analog voltage storing capacitor 29 (FIG. 1B) is charged during every charging cycle time. After that, other analog switches $SB_1$ to $SB_8$ are switched on and each analog voltage storing capacitor 29 is charged alike. Thus, analog switches $SA_1$ to $SA_8$, $SB_1$ to $SB_8$, $SC_1$ to $SC_8$ and $SD_1$ to $SD_8$ are switched successively and the like operation continues repeating.

A time required for switching each of analog switches $SA_1$ to $SA_8$, $SB_1$ to $SB_8$) $SC_1$ to $SC_8$ and $SD_1$ to $SD_8$ is e.g. 1 ms as shown in FIG. 2B and the charging cycle time of the analog voltage storing capacitor 26 is 4 ms + Tc (blank time), resulting in little blank time Tc for the CPU 26.

A circuit diagram of the prior art shown in FIG. 1A provides a relatively high repetition rate operation, leaving long blank time Tc available for other operations of CPU 26 than switching because each analog voltage storing capacitor 29 is charged in each of four channels in parallel. However, the circuit comprising four sets of D/A converters and interface circuits is expensive in cost.

Another circuit of the prior art shown in FIG. 2A is simple and not expensive because only a singal set of a D/A converter and an interface circuit is employed. However, switching operation of each of analog switches under the software control of a CPU 26 requires the CPU 26 occupied for a long time with not enough blank time available for other operations of the CPU 26 then switching because of a long analog voltage charging cycle time as shown in FIG. 2B. Another CPU is therefore required for other operations.

SUMMARY OF THE INVENTION

An object of the present invention is to provide an improved control method to obtain enough blank time available for other operations of a CPU than switching by employing only a single D/A converter.

Another object of the present invention is to provide an improved control method to obtain a long blank time available for other operations of a CPU than switching by means of properly combined analog switch groups, one of which is time-divisionally switched on fast analog signals converted from data requiring a fast response every capacitor charging cycle during which analog voltage storing capacitors are charged and the other which are time-divisionally switched on slow analog signals converted from data requiring a slow response, skipping the charging cycles, in which fast analog signals are deliverable in spite of the long blank time obtained.

Other objects, advantages and features of the present invention will become apparent to those having ordinary skill in the art upon a reading of the following description when taken in conjunction with the accompanying drawings.

DESCRIPTION OF THE PREFERRED EMBODIMENTS

Figure 3A:
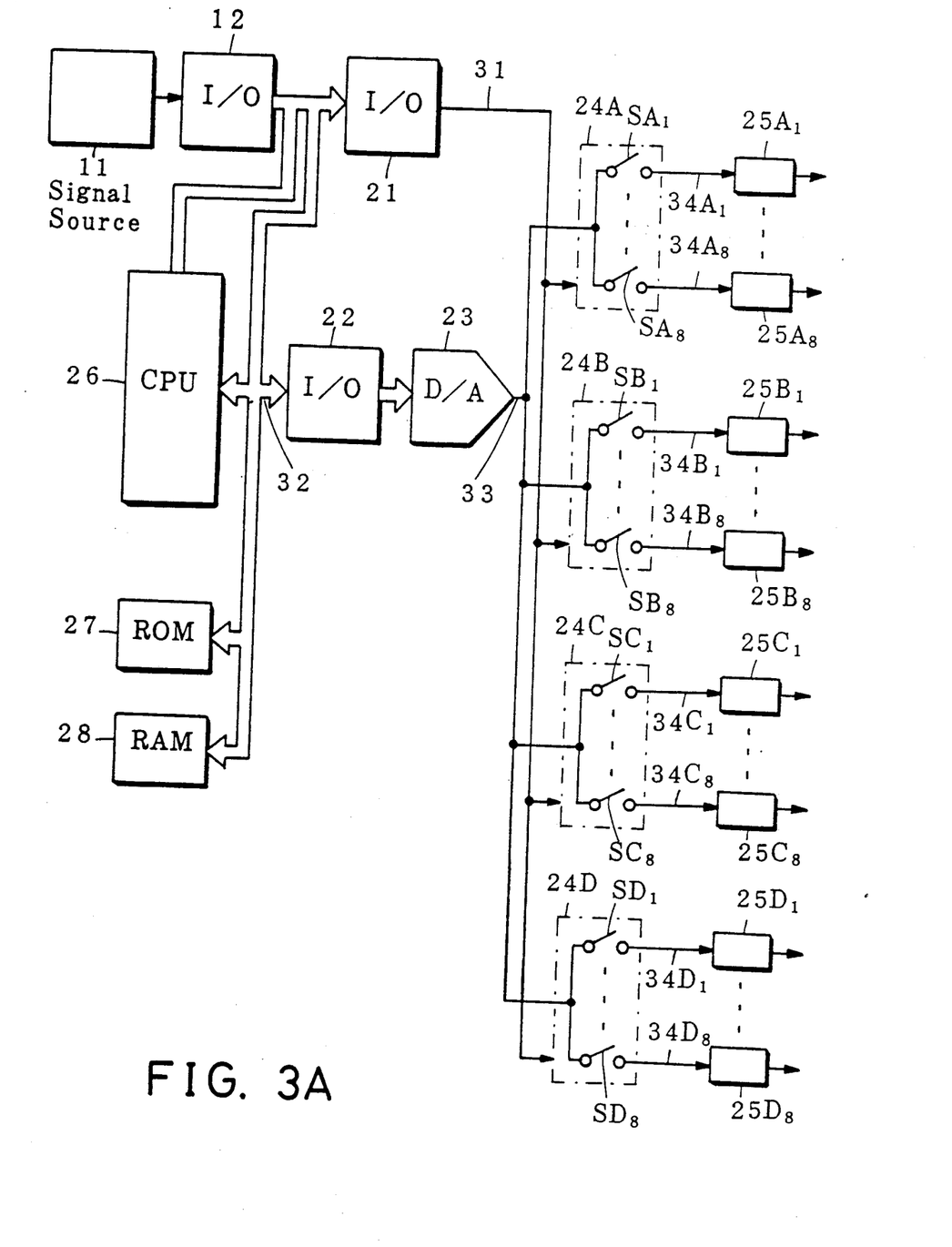
FIG. 3A is a block diagram illustrating an embodiment according to the present invention.

An embodiment of the present invention is illustrated in FIG. 3A showing a circuit diagram, wherein like reference numerals and symbols represent like parts which correspond to those shown in FIG. 2A.

Referring to FIG. 3A, a signal source 11 like a rotary encorder delivers a digital signal through an interface (I/O) 12. A bus signal 32 to be D/A converted comprises data selected from a RAM 28 or selected from the signal source 11.

A CPU 26 sends an analog switch control signal 31, by which one like 24A of analog switch groups 24A to 24D is turned on to obtain fast analog signals converted from fast data, which require fast responses, upon every charging cycle of an analog voltage storing capacitor 29 (FIG. 1B), while the remaining analog switch groups 24B to 24D are turned on sequentially to obtain slow analog signals converted from slow data, which require slow responses, upon every charging cycle.

Figure 3B:
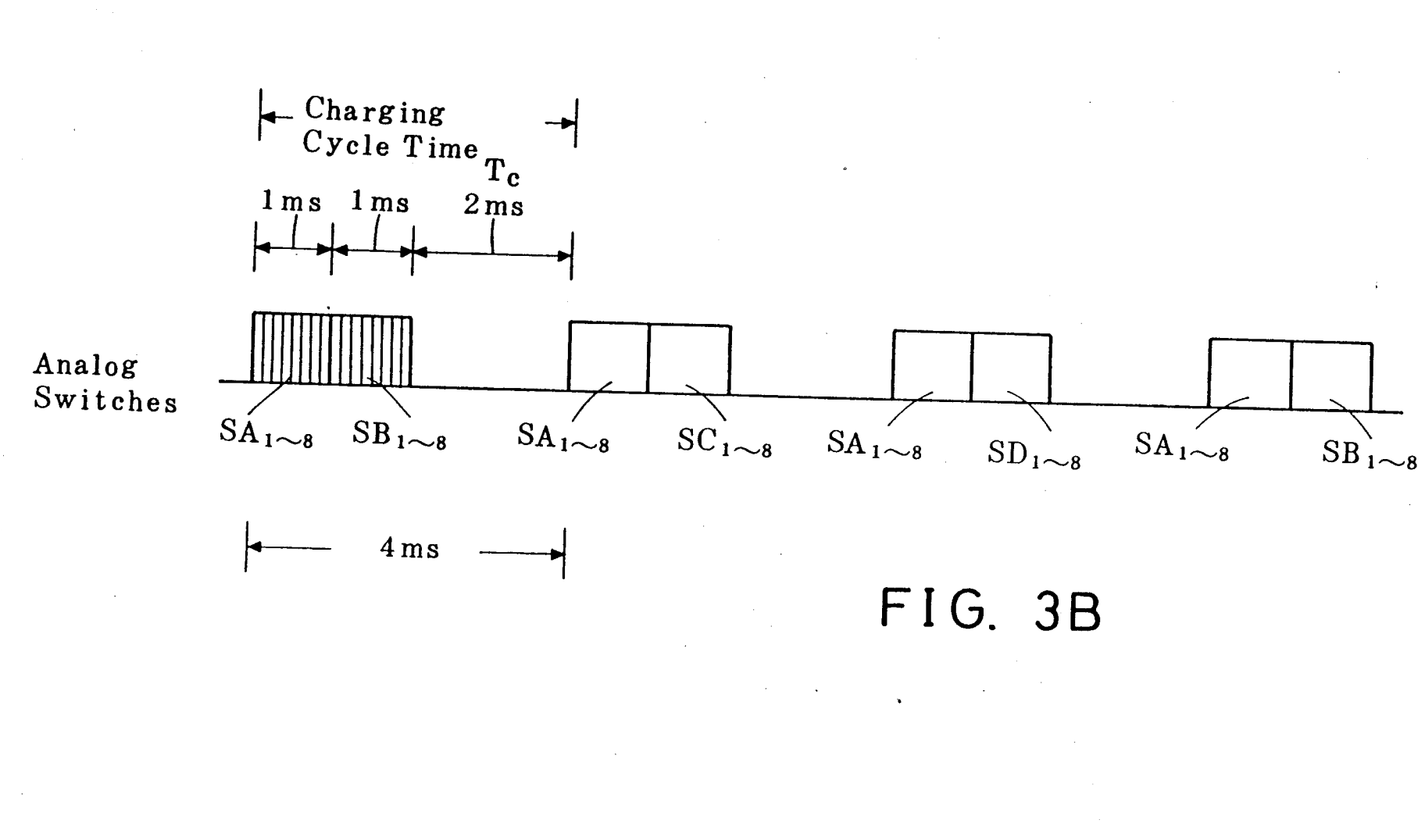
FIG. 3B is a time chart showing operations of analog switches shown in FIG. 1A.

Referring to FIG. 3B which illustrates an example of a timing relationship in such a circuit operation, each capacitor 29 (FIG. 1B) connected with each of analog switches $SA_1$ to $SA_8$ of the group 24A, which is turned on, is charged and each capacitor 29 connected with each of switches $SB_1$ to $SB_8$ of the group 24B, which is turned on, is charged during a charging cycle time, in which the other switches $SC_1$ to $SC_8$ and $SD_1$ to $SD_8$ of groups 24C and 24D are still off. Each of switches $SA_1$ to $SA_8$ is turned on again and each of switches $SC_1$ to $SC_8$ is turned on during the next charging cycle time in which the other switches $SB_1$ to $SB_8$ and $SD_1$ to $SD_8$ are kept off.

Repeating such an operation upon every cycle time of e.g. 4 ms, the CPU 26 obtains each blank time Tc of 2 ms that is the remainder substracted 2 ms of a pair of 1 ms of the switched-on time of switches $SA_1$ to $SA_8$ and 1 ms of the same of switches $SB_1$ to $SB_8$, $SC_1$ to $SC_8$ or $SD_1$ to $SD_8$ from every charging cycle time of 4 ms.

Figure 3C:
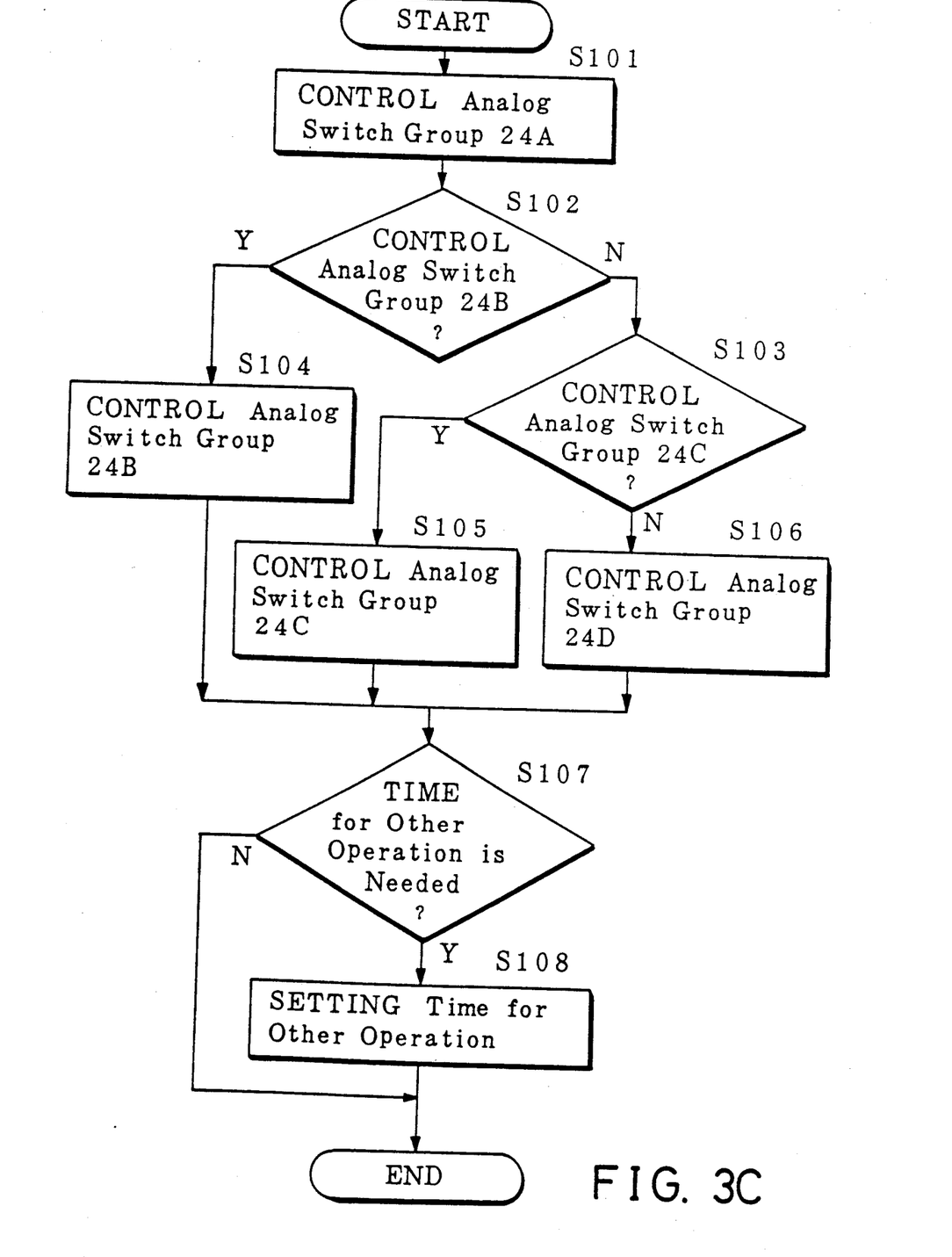
FIG. 3C is flowchart showing an operational flow of the circuit shown in FIG. 3A.

An operational flow controlling analog switch groups 24A to 24D will now be described referring to FIG. 3C. The analog switch group 24A is controlled by the analog switch control signal 31 applied from CPU 26 (FIG. 3A) to charge each capacitor 29 connected to the switch group 24 (S101, FIG. 3C).

It is asked whether the analog switch group 24B has to be controlled or not (S102).

When the group 24B has to be controlled (S102Y), the group 24B is controlled to charge each capacitor 29 connected thereto (S104). When not controlled in the step S102 (S102N), it is asked whether the group 24C has to be controlled or not (S103). When controlled (S103Y), the group 24C is controlled to charge each capacitor 29 connected thereto (S105). When not controlled in the step S103 (S103N), the group 24D is controlled to charge each capacitor 29 connected thereto (S106). It is asked whether the CPU 26 needs a time available for an operation other than switching or not (S107, FIG. 3D). When the CPU 26 needs the time (S107Y), the time available for an operation other than switching is set (S108). Further the operation starting from the step S101 is repeated. On the other hand, when the time for another operations (S107N) is not needed, the operation starting from the step S101 is repeated.

Four analog switch groups 24A to 24D are employed in FIG. 3B. However more analog switch groups e.g. eight groups 24A to 24H are employable, in which analog switch groups 24A, B, C may be switched on during the first charging cycle, those 24A, D, E during the second cycle, those 24A, F, G during the third cycle, those 24A, B, H during the fourth cycle and those 24A, C, D during the fifth cycle.

As described above, a control method according to this invention can reduce the working time of the CPU for switching on or off each analog switch, to obtain the blank time for other operations of the CPU other than the switching operation.

Further, analog switches, which are switched on every storing cycle, are used for fast analog signals, which are rapidly changed as vertical and horizontal positioning setting signals in an oscilloscope, while the others, which are switched on every skipped different storing cycle are used for slow analog signals, which are slowly changed as adjusting signals and calibration signals of vertical or horizontal amplifiers, so that the blank time for the CPU is obtainable. Further, the employment of a D/A converter cause a simple construction and an inexpensive cost at no sacrifice of the fast response.

While the preferred form of the present invention has been described, it is to be understood that modifications will be apparent those skilled in the art without departing from the spirit of the invention.

The scope of the invention, therefore, is to be determined solely by the following claim.

What is claimed is:

1. A control method of a multi-channel digital-to-analog converting circuit, which has a digital-to-analog converting means for converting applied digital data to analog signals, n analog switch groups in which each group includes m analog switches for delivering said analog signal from said digital-to-analog converting means, and m×n analog voltage storing circuits, where m and n are both positive integers greater than 1, in which each circuit momentarily stores said analog signal delivered from said analog switch, comprising:
   operating a specific one of said n analog switch groups every storing cycle, and
   operating each of remaining switch groups sequentially every storing cycle.

2. A method for controlling a multi-channel digital-to-analog converting circuit having a digital-to-analog converter for converting an input digital signal to an analog signal comprising the steps of:
   inputting said analog signal to n analog switch groups, wherein each analog switch group includes m switches, wherein n and m are positive integers greater than 1;
   storing outputs of said n analog switch groups into m×n analog voltage storing circuits;
   controlling said n analog switch groups such that a specific one of said n analog switch groups is operated every storing cycle and each of the remaining n analog switch groups are operated sequentially every storing cycle.

3. The method according to claim 2, wherein said m×n voltage storing circuits are comprised of a voltage storing capacitor and an operational amplifier.

4. The method according to claim 2, wherein said controlling step further comprises the steps of:
   generating a control signal by a microprocessor;
   feeding said control signal through an input/output interface to said n analog switch groups to thereby control said n analog switch groups.

5. A control system for a multi-channel digital-to-analog converting circuit comprising:
   a digital-to-analog converter for converting applied digital signals to analog signals:
   n analog switch groups for receiving and outputting said analog signals, wherein each analog switch group includes m switches, where n and m are both positive integers greater than 1;
   m×n analog storing circuits for receiving said analog signal outputs from said analog switch groups and temporarily storing said analog signal outputs; and
   control means for operating a specific one of said n analog switch groups every storing cycle and operating each of the remaining switch groups sequentially every storing cycle.

6. The control system of claim 5, wherein said m×n voltage storing circuits are comprised of a voltage storing capacitor and an operational amplifier.

7. The control system of claim 5, wherein said control means comprises a microprocessor and an input/output interface to interface said microprocessor to said n analog switch groups.

* * * * *